United States Patent [19]

Smith et al.

[11] 4,391,050
[45] Jul. 5, 1983

[54] TOOTH ASSEMBLY

[75] Inventors: Wayne G. Smith; Herman J. Maurer, both of Burlington, Iowa

[73] Assignee: J. I. Case Company, Racine, Wis.

[21] Appl. No.: 259,347

[22] Filed: May 1, 1981

[51] Int. Cl.³ .............................................. E02F 9/28
[52] U.S. Cl. ................................ 37/142 A; 37/141 T; 403/334; 403/361
[58] Field of Search ............. 37/141 R, 141 T, 142 R, 37/142 A; 403/334, 361, 315

[56] References Cited

U.S. PATENT DOCUMENTS

| 1,620,132 | 3/1927 | Psilander | 37/142 R |
| 2,124,230 | 7/1938 | Hosmer et al. | 37/142 R |
| 2,884,274 | 4/1959 | Donnell | 403/334 |
| 2,885,801 | 5/1959 | Hill | 37/142 R |
| 3,041,752 | 7/1962 | Evans | 37/142 A |
| 3,225,467 | 12/1965 | Troeppl | 37/142 A |
| 3,312,004 | 4/1967 | Johnson | 37/142 A |
| 4,098,013 | 7/1978 | Hemphill | 37/142 R |

Primary Examiner—Edgar S. Burr
Assistant Examiner—Moshe I. Cohen
Attorney, Agent, or Firm—Cullen, Sloman, Cantor, Grauer, Scott & Rutherford

[57] ABSTRACT

A digging tooth assembly for an excavating machine including a digging tooth having a resilient housing for mounting the tooth to the forward end of a digging tooth shank. A wedge-shaped projection or retaining member is mounted to the top surface of the shank for locking engagement within a cut-out or socket formed in the housing for mounting the digging tooth. The digging tooth is held on the tip of the shank by the locking coaction between the wedge-shaped projection and cut-out and the resiliency of the housing. The top surface of the digging tooth abuts against the flat bottom surface of the shank such that impact forces are transmitted through the resilient digging tooth housing to the shank thereby providing the digging tooth with increased flexibility and longer wear life. The present construction provides for vertical cutting action by the digging tooth shank and horizontal cutting action by the digging tooth for improved loosening of the earth being excavated.

1 Claim, 4 Drawing Figures

U.S. Patent     Jul. 5, 1983     4,391,050
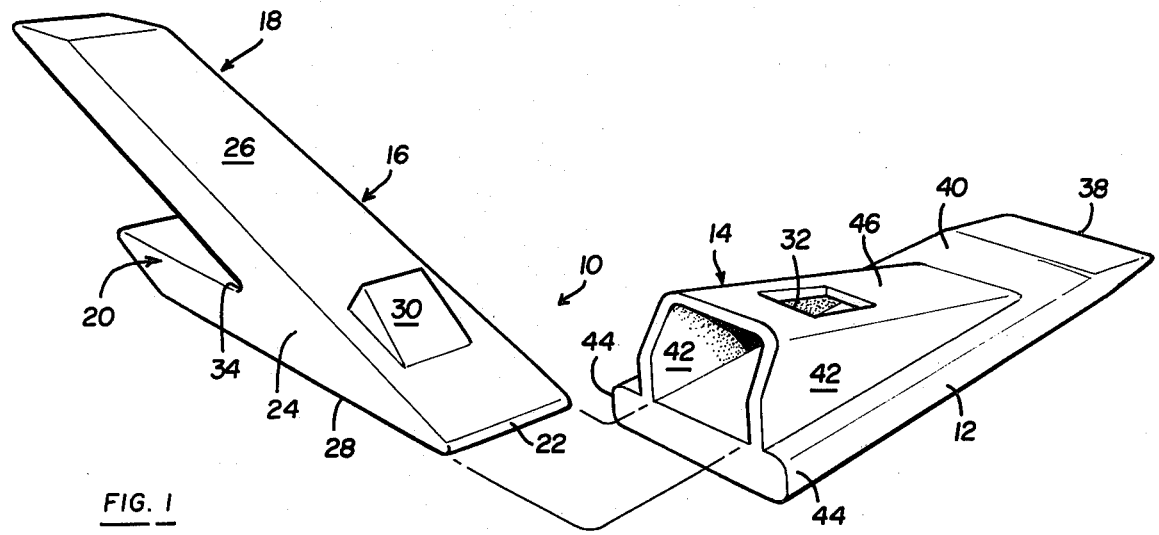
FIG. 1
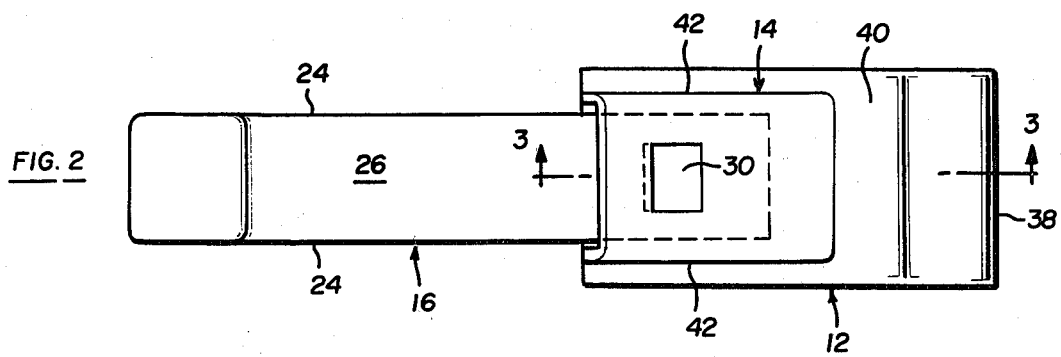
FIG. 2
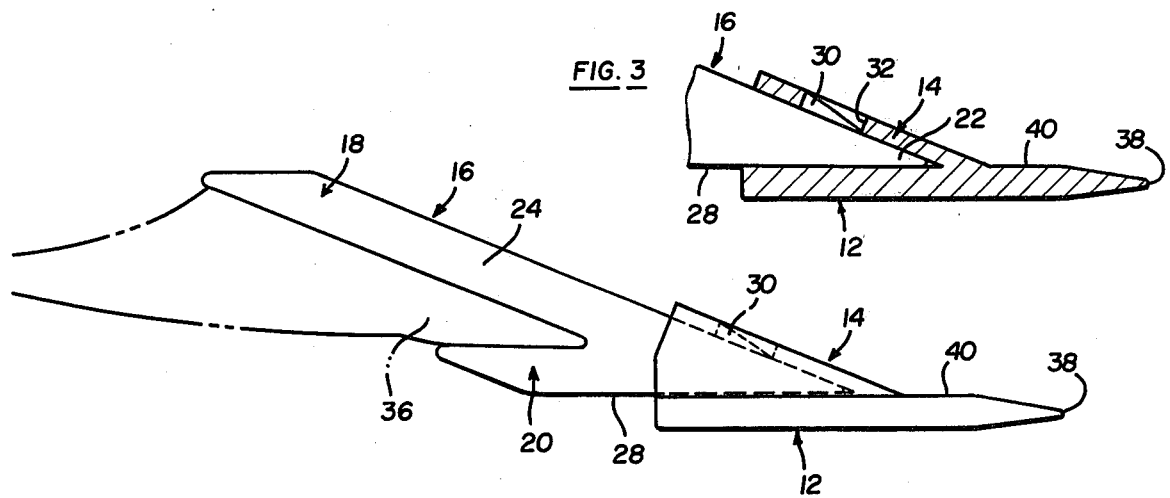
FIG. 3
FIG. 4

TOOTH ASSEMBLY

BACKGROUND OF THE INVENTION

The present invention relates to a digging tooth assembly and more particularly to a digging tooth which is separable or detachable from a supporting shank to provide a structure which is simple and inexpensive to manufacture, convenient and quick to operate, and dependable in operation.

It is conventional to provide digging teeth for excavating machines for the purpose of loosening the earth or material being excavated or loaded. These digging teeth are subjected to severe usage in operation, and accordingly, it has become common practice to construct the digging teeth in the form of a separable assembly having a shank fixed on the excavating equipment and a removable digging tooth which can be replaced.

The most common form of replaceable digging teeth require special pins, keys, bolts or the like for fastening purposes. The severe impact and shock to which the teeth are subjected during ordinary usage distorts, damages, or wears the bolts and surfaces forming the keys in a manner preventing easy removal for repair or replacement. Further, it has been difficult to obtain firm seating between the supporting shank and the digging tooth fastened thereto. Relative movement between the digging tooth and supporting shank tends to wear the interfitting faces thereby necessitating eventual replacement of both the shank and digging tooth.

Accordingly, it is an object of the present invention to provide a replaceable digging tooth which is not dependent upon the use of bolts, pins, keys, or other fastening members having similar shortcomings and which includes a retaining means that keeps the digging tooth positively assembled and protected against wear and breakage.

Still another object of the present invention is a digging tooth assembly wherein the construction of the supporting shank and retaining means for the digging tooth will increase the life of the cutting edge of the digging tooth while increasing the ease with which the digging tooth enters the material being excavated.

SUMMARY OF THE INVENTION

The structure embodying the present invention includes a digging tooth with a resilient housing for mounting the tooth which is applied to the forward end of a digging tooth shank. The shank is a generally V-shaped elongated element including top and bottom spaced apart portions which converge at one end to form a tip portion for the shank. The digging tooth housing fits over the tip portion of the shank and is releasably secured on the shank by retaining means.

The spaced apart top and bottom portions which form the generally V-shaped digging tooth shank have flat parallel sides and flat top and bottom surfaces which converge to the tip portion of the shank. A wedge-shaped projection or retaining member is mounted to the top surface of the shank for locking engagement within a cut-out or socket formed in the housing for mounting the digging tooth. The undercut formed by the converging top and bottom portions of the shank conforms in configuration to the shape of the cutting edge of the excavating apparatus. The top portion of the shank is substantially longer than the bottom portion and extends above the cutting edge and is secured thereto in a conventional manner.

The digging tooth is an elongated, spike-like element of hard wear resisting material that is substantially rectangular in transverse cross-section and tapers to a digging point at its forward end to thereby provide the desired digging action. The housing which is formed of a malleable or resilient material is secured to the top side of the digging tooth for embracing the tip portion of the supporting shank and mounting the digging tooth. The housing is open on one end and includes opposed side walls which intersect the top surface of the digging tooth inwardly of the sides of the tooth to create relief for piercing the earth or the like being excavated.

The retaining means for the digging tooth includes the wedge-shaped projection or retaining member on the top surface of the supporting shank which projection is inclined and is received in a cut-out or a socket provided in the top side of the housing for mounting the digging tooth. The digging tooth housing is held on the tip of the shank by the locking coaction between the wedge-shaped projection and cut-out and the resiliency of the housing.

An important feature of the present construction resides in the mounted location of the digging tooth relative to the supporting shank. The digging tooth is not mounted in end-to-end contact with the supporting shank as is conventional. Instead, the top surface of the tooth abuts against the flat bottom surface of the shank. With this construction, impact forces against the digging tooth are transmitted through the resilient digging tooth housing to the supporting shank. Thus, the resilient housing provides the digging tooth with flexibility for absorbing impact thereby increasing the wear characteristic of the digging tooth.

Another advantage provided by the present construction is that the supporting shank breaks up the soil as it passes across the top of the digging tooth during excavation. The cutting edge of the digging tooth lies on a horizontal plane whereas the longitudinal axis of the supporting shank lies on a vertical plane that is perpendicular to the digging tooth cutting edge. During excavation, the soil is first loosened in a horizontal direction by the cutting edge of the digging tooth, and as the soil passes across the top of the digging tooth, it is then cut in a vertical direction by the supporting shank. Thus, the supporting shank provides a cutting action in the soil which supplements the cutting action from the digging tooth.

Other advantages and meritorious features of the digging tooth assembly of the present invention will be more fully understood from the following description of the invention, the appended claims, and the drawings, a brief description of which follows.

BRIEF DESCRIPTION OF DRAWINGS

FIG. 1 is a perspective view of the digging tooth removed from the supporting shank.

FIG. 2 is a top plan view of the digging tooth mounted on the supporting shank.

FIG. 3 is a cross-sectional view taken along line 3—3 in FIG. 2.

FIG. 4 is a side elevational view of the digging tooth assembly mounted to the cutting edge of an excavating apparatus.

DETAILED DESCRIPTION OF THE INVENTION

A preferred embodiment of the digging tooth assembly made in accordance with the teachings of the present invention is illustrated in FIGS. 1–4.

The digging tooth assembly 10 includes a digging tooth 12 with a resilient housing 14 for mounting the tooth which is applied to the forward end of a digging tooth shank 16. The shank 16 is a generally V-shaped elongated element including top and bottom spaced apart portions 18 and 20 which converge at one end to form a top portion 22 for the shank. The digging tooth housing 14 fits over the top portion 22 of the shank 16 and is releasably secured on the shank by retaining means, as will be described.

The spaced apart top and bottom portions 18 and 20 which form the generally V-shaped digging tooth shank 16 have flat parallel sides 24 and flat top and bottom surfaces 26 and 28 which converge to the tip portion 22 of the shank. A wedge-shaped projection or retaining member 30 is mounted to the top surface 26 of the shank 16 for locking engagement within a cut-out or socket 32 formed in the housing 14 for mounting the digging tooth 12. The undercut 34 formed by the converging top and bottom portions 18 and 20 of shank 16 conforms in configuration to the shape of the cutting edge 36 of the excavating apparatus. The top portion 26 of the shank 16 is substantially longer than the bottom portion 20 and extends above the cutting edge 36 and is secured thereto in a conventional manner.

The digging tooth 12 is an elongated, spike-like element of hard wear-resisting material that is substantially rectangular in transverse cross-section and tapers to a horizontal digging edge 38 at its forward end to thereby provide the desired digging action. The housing 14 which is formed of a malleable or resilient material is secured to the top side 40 of the digging tooth 12 for embracing the tip portion 22 of the supporting shank 16 and mounting the digging tooth 12. The housing 14 is open on one end and includes opposed side walls 42 which intersect the top surface 40 of the digging tooth 12 inwardly of the sides 44 of the tooth to create relief for piercing the earth or the like being excavated.

The resilient housing 14 is shaped and proportioned to closely engage about the tip portion 22 of shank 16. Housing 14 is substantially U-shaped in transverse cross-section, having spaced side walls 42 and a top wall 46 extending between and connecting the side walls 42. The side walls 42 of housing 14 are flat and substantially parallel to lie closely against the sides 24 of supporting shank 16. The side walls 42 of housing 14 are substantially triangular in side elevation and their upper edges slope downwardly and forwardly to engage against the shank tip portion 22.

The retaining means for the digging tooth 12 includes the wedge-shaped projection or retaining member 30 on the top surface 26 of the supporting shank 16 which projection is inclined and is received in the cut-out or socket 32 provided in the top side 46 of housing 14 for mounting the digging tooth 12. The digging tooth housing 14 is held on the tip 22 of shank 16 by the locking coaction between the wedge-shaped projection 30 and cut-out 32 and the resiliency of the housing 14.

An important feature of the present construction resides in the mounted location of the digging tooth 12 relative to the supporting shank 16. The digging tooth 12 is not mounted in end-to-end contact with the supporting shank 16 as is conventional. Instead, the top surface 40 of the tooth 12 abuts against the flat bottom surface 28 of shank 16. With this construction, impact forces against the digging tooth 12 are transmitted through the resilient digging tooth housing 14 to the supporting shank 16. Thus, the resilient housing 14 provides the digging tooth 12 with flexibility for absorbing impact thereby increasing the wear characteristic of the digging tooth 12.

Another advantage provided by the present invention is that the supporting shank 16 breaks up the soil as it passes across the top 40 of the digging tooth 12 during excavation. The cutting edge 38 of the digging tooth 12 lies on a horizontal plane whereas the longitudinal axis of the supporting shank 16 lies on a vertical plane that is perpendicular to the digging tooth cutting edge 38. During excavation, the soil is first loosened in a horizontal direction by the cutting edge 38 of the digging tooth 12, and as the soil passes across the top 40 of the digging tooth, it is then cut in a vertical direction by the supporting shank 16. Thus, the supporting shank 16 provides a cutting action in the soil which supplements the cutting action from the digging tooth.

From the foregoing, it will be apparent that a simple and conveniently operable removable and replaceable digging tooth is provided. A hammer may be used to apply and remove the digging tooth 12, and when the digging tooth is in a working position projection 30 engages the socket 32 to cause digging tooth 12 to be urged rearwardly into tight engagement with shank tip 22. When the digging tooth 12 is forced on to shank tip 22, the wedging action of housing 14 on tip portion 22 tensions projection 30 against cut-out 32 so that there is no tendency for looseness to develop when the parts are in their working position.

It will be apparent to those skilled in the art that the foregoing disclosure is exemplary in nature rather than limiting, the invention being limited only by the appended claims.

We claim:

1. A digging tooth assembly comprising:
   an elongated generally rectangular digging tooth of hard wear-resisting material having substantially parallel top and bottom surfaces and opposed side surfaces, said digging tooth being substantially rectangular in transverse cross-section and tapered to a horizontal cutting edge at one end;
   a generally V-shaped support shank including top and bottom spaced apart portions which converge at one end to form a tip portion for the shank, said shank including flat top and bottom surfaces which converge to said tip portion, said top and bottom portions of said shank forming an undercut adaptable for mounting said shank on the cutting edge of an excavating machine;
   a resilient housing mounted to the top surface of said digging tooth, said housing having an open end and including opposed side walls which intersect the top surface of said digging tooth inwardly of the opposed side surfaces of said digging tooth, and said housing being mounted over the tip portion of said shank, said housing being substantially U-shaped in transverse cross-section having a top wall extending between and connecting said side walls, said side walls being flat and substantially parallel to lie closely against the tip portion of said shank and said side walls being substantially triangular in side elevation and including upper edges sloping downwardly and forwardly to engage against said tip portion of said shank;

retaining means for releasably securing said digging tooth to said shank, said retaining means including a wedge-shaped projection mounted on the top surface of said shank, said projection being inclined relative to said shank top surface, said projection being received for locking engagement within an opening formed through the top wall of said housing for mounting said digging tooth to said shank, and said digging tooth being held on said shank tip portion by the locking coaction between said projection and said opening and the resiliency of said housing; and said top surface of said digging tooth abutting only against the flat bottom surface of said shank and said bottom surface of said digging tooth being spaced downwardly from the bottom surface of said shank with the top and bottom surfaces of said digging tooth being generally parallel to the bottom surface of said shank such that the impact force against said tooth is transmitted through said resilient housing to said support shank, and wherein the longitudinal axis of said support shank being on a vertical plane that is perpendicular to the horizontal digging tooth cutting edge, and the digging tooth cutting edge providing a horizontal cutting action during excavation whereas said supporting shank providing a subsequent vertical cutting action.

* * * * *